April 21, 1970     G. E. WILLIAMS ET AL     3,507,939
PLASTIC EXTRUSION
Filed Dec. 12, 1966
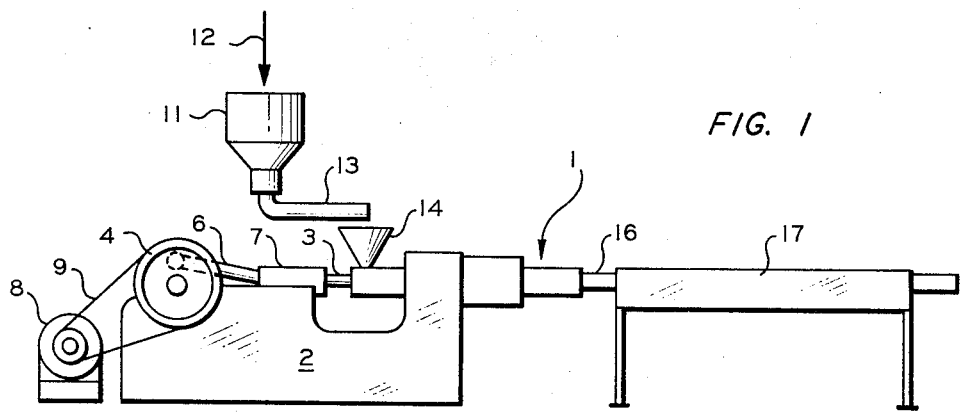
FIG. 1
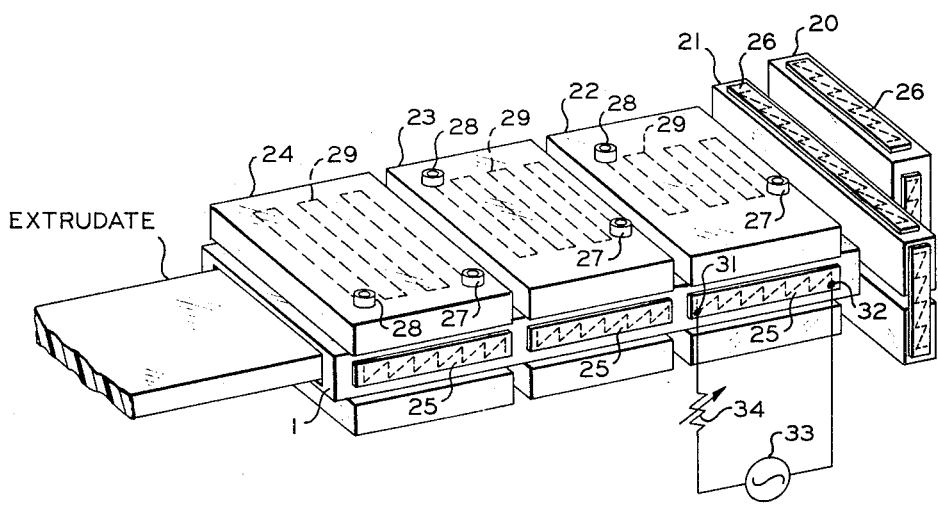
FIG. 2
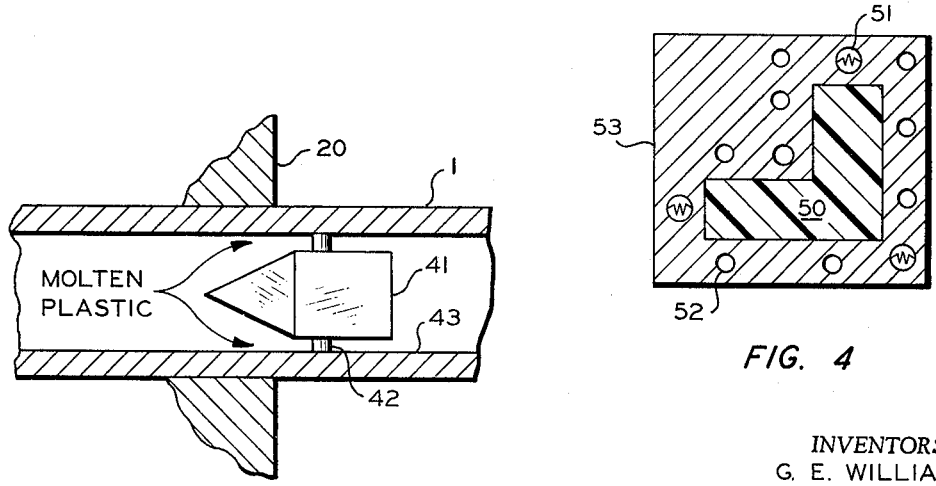
FIG. 3
FIG. 4
INVENTORS
G. E. WILLIAMS
G. E. CARROW
BY *Young & Quigg*
ATTORNEYS

United States Patent Office 3,507,939
Patented Apr. 21, 1970

3,507,939
PLASTIC EXTRUSION
George E. Williams and Guy E. Carrow, Bartlesville,
Okla., assignors to Phillips Petroleum Company, a
corporation of Delaware
Filed Dec. 12, 1966, Ser. No. 601,094
Int. Cl. B29f 3/08
U.S. Cl. 264—40                                       13 Claims

ABSTRACT OF THE DISCLOSURE

Different circumferential portions of the cross section of a plastic extrusion die are heated or cooled at different rates to obtain an extrudate with reduced internal stresses.

---

This invention relates to the extrusion of plastic materials. In one aspect this invention relates to dies for producing extrudates from molten plastic materials. In another aspect this invention relates to method and apparatus for producing substantially stress-free extrudates.

Extrusion is often used to produce an elongated profile shape. In the extrusion process, a pump, usually in the form of a screw or plunger operating in a closely fitting barrel, forces molten plastic material through an orifice which has a shape designed to produce the desired cross section of an extrudate. Extrusion frequently produces an extrudate having high internal stresses and the extrudate must be annealed before it can be used in certain applications. For example, when the molded parts are to be excessively stressed or where maximum dimensional stability is required, annealing may be necessary. Annealing is an additional operation in the fabrication procedure for producing plastic articles and adds to the cost of production.

Accordingly, it is an object of this invention to reduce internal stresses in an extruded product.

Another object of this invention is to provide a method and apparatus for extruding plastic materials.

Another object of this invention is to effect economies in the production of stress-free extrudates.

These and other objects of this invention will become apparent to one skilled in the art upon studying the following description, the accompanying drawings and appended claims.

FIGURE 1 is a diagrammatic illustration of an extrusion apparatus which can be used in the practice of this invention.

FIGURE 2 illustrates heating and cooling means for a die.

FIGURE 3 illustrates an embodiment of a die containing a flow diversion device.

FIGURE 4 illustrates one embodiment of the heating and cooling means of a die in cross section.

According to the invention the removal of different amounts of heat from different portions of a bushing of a die through which a plastic material is extruded results in an extrudate having reduced internal stresses as compared to the internal stresses in extrudate from a die from which heat is uniformly removed.

In accordance with the invention, one portion of the periphery of a cross section of a die is heated while an adjacent portion of the periphery of the same cross section is cooled.

Further in accordance with the invention, a cooling medium is circulated at a first temperature through cooling means in a certain portion of the die bushing while cooling medium is circulated at a second temperature through cooling means in another portion of the die bushing.

Further in accordance with the invention, those peripheral portions in adjacent planes of a die which both accept substantially equal amounts of heat from an extrudate passing through the die, and thus cool a portion of the extrudate faster than a portion which is further removed from the junction of the portions of adjacent planes, are heated so that the amount of heat transferred to these peripheral portions is reduced to a value more nearly equal to the average cross sectional cooling rate of the extrudate. Preferably the die is provided with converging or tapering land surfaces so that continuous contact between the extrudate and land surfaces is maintained.

As used in this application, "cooling rate" and "cross sectional cooling rate" will refer to the rate of heat transfer through the periphery of a given cross section.

When coolant is circulated on or through all of the sides of a die that portion of the cross sectional area of an extrudate proximate to the junction of adjacent surfaces of the extrudate is subject to strains and warpage. Internal or "frozen in" stresses are especially evident in these portions of an extrudate. Part of these internal stresses can be attributed to the fact that the extrudate portion is subjected to cooling by two adjacent surfaces and cools at a faster rate than the surface portion of the extrudate which is located further away from the junction of adjacent cooling surfaces. By controlling the amount of heat transferred by the extrudate to different portions of the die bushing, as described above, to obtain a more nearly constant cross sectional cooling rate in the extrudate, the internal stresses in an extrudate are greatly reduced. Profiles of greater thickness with reduced internal stresses can be commercially produced by the practice of this invention. If annealing is still necessary to fabricate an acceptable extrudate product, the time for and intensity of the annealing step is greatly reduced.

The cooling and hence the solidification of a plastic material in a die causes the plastic material to shrink slightly and the outer surface does not remain in contact with the land surfaces of the die; the result being that a gap is formed between the partially solidified plastic and the interior surfaces of the die. This gap acts as an insulator between the interior surface of the die and the plastic, making the control of heat transfer more difficult because the heat must now be transferred from the plastic by convection across the gap rather than by conduction as when the plastic is in contact with the inner surface of the die.

The formation of a convection gap as the extrudate passes through a die can be avoided by reducing the cross sectional area of the die at the exit portion of the die as compared to the entrance cross sectional area of the die. A reduction in cross sectional area compensates for shrinkage during solidification thus maintaining contact between the inner surface of the die and the extrudate. Reduction in cross sectional area can be effected by land tapering or by converging opposite sides of the die. The amount of reduction in cross sectional area is governed by the shrinkage characteristics of the material being extruded. This type of die structure not only serves to eliminate the convection gap and allow effective control of heat transfer but produces an extrudate which is smooth and free of wrinkles.

As described above, a more nearly constant cross sectional cooling rate can be obtained and internal stresses in an extrudate can be reduced by selectively cooling certain portions of the die bushing, or by cooling a portion of the die bushing while heating another portion of the bushing. The location of the cooling means and the heating means on a die bushing will depend upon the particular profile of the extrudate and the flow characteristic of the melt being extruded. In some instances, it is desirable to position a flow diversion device in the entrance portion of the die to divert hot molten plastic material against the land surfaces of the die, thus initially heating the die and reducing the amount of heat transferred to the die necessary to reduce internal stresses in the extrudate.

Referring now to the drawings wherein like reference numerals are used to denote like elements and particularly to FIGURE 1 the invention will be described in more detail. Many valves, switches, controls, etc., not necessary to explaining the invention to one skilled in the art have been omitted from the drawing for the sake of clarity.

The extrusion die of this invention shown generally by reference numeral 1 is illustrated in conjunction with a dynamic extrusion apparatus including a frame 2 which supports a piston 3 connected to a fly wheel 4 by means of a connecting rod 6 and a cross head 7. A motor 8 and a belt 9 will reciprocate piston 3 in response to rotational motion of motor 8.

A thermoplastic material in particle form can be charged to storage hopper 11 by any conventional means 12. A spout 13 can be used to transmit the particles from storage hopper 11 to feed hopper 14 at a controllable rate which will direct the particles into positions such that they can be contacted and advanced by piston 3 through the passageway of extrusion die 1. The extrudate 16 is in the form of an elongated article which can be supported by means of support 17 after the extrudate emerges from extrusion die 1. The support 17 can be provided with cooling means for further reducing the extrudate temperature or with annealing means to remove any residual stresses from the extrudate.

Although the extrusion die of this invention is illustrated as being used in conjunction with a dynamic extrusion process, it is evident that this is for the purpose of illustration only and that the extrusion die can be used with any extruder including single screw extruders, multiple screw extruders, multiple dies, and the like providing they have the necessary pumping capacity.

Referring now to FIGURE 2 the heating and cooling means will be described in more detail. In its broadest aspect the invention is not limited by the exact configuration illustrated in FIGURE 2 since the concept of simultaneously heating and cooling a portion of the die can be applied to dies of various design. However, the configuration of FIGURE 2 gives excellent results in the extrusion of a generally rectangular extrudate.

The extrusion die 1 is a long land die or a die having a passage length relatively large as compared with the thinnest portion or "thickness" of the extrudate and wherein a temperature gradient is maintained from a temperature above the melt temperature of the composition being extruded at an upstream point in the die to a temperature below the composition solidification temperature at the exit portion of the die. The extrusion die 1 includes transition plate 20 and retainer 21 for attaching die 1 to the extruder, cooling zones 22, 23, and 24 are attached to the bottom and top of the die and side heaters 25 are attached to the sides of die 1. Heaters 26 are attached to transition plate 20 and retainer 21 in order to maintain a desired melt temperature.

One cooling zone could be used to cool the entire top or bottom length of the die; it is preferred to provide a plurality of zones, each having its own inlet 27 and outlet 28 so that coolants of different temperature can be circulated through the different zones. Cooling channels 29 within zones 22, 23, and 24 can be varied in width and position to aid in controlling cooling rates.

The plurality of strip heaters 25 is positioned on the side bushings of die 1 to control the amount of heat transfer to those surfaces. It is advantageous to use embedded electrical heaters connected by terminals 31 and 32 to a source of electrical power schematically denoted as 33 having a suitable control means 34, thus allowing control of the amount of heat transferred to the side bushings.

In some instances it is desirable to provide a flow diversion device on the entrance portion of die 1 as illustrated in FIGURE 3. A wedge-shaped flow diversion is positioned in the entrance portion of die 1 in line with transition plate 20 and is supported by a plurality of elements 42. Molten plastic flowing into the die is diverted against land surfaces 43 and heats the surfaces by reducing the amount of heat transfer to the sides of the die necessary to obtain the desired constant cooling rate. A wedge-shaped device has been illustrated but any suitable shape can be used.

FIGURE 4, a cross section of a sizing die and L-shaped extrudate 50, shows the position of heating means 51 and cooling channels 52 in die bushing 53 which gives the desired constant cooling rate.

The following examples serve to further illustrate the invention.

EXAMPLE I

An ethylene copolymer of 1.5 high load melt index (ASTM D1238–62T, condition F) having a nominal density of 0.941 (ASTM D1505–63T) containing about 0.1 weight percent heat stabilizing additive and about 1 weight percent lubricant was extruded into a one inch-thick by seven inch-wide slab at a rate of 2 inches per minute or 35 pounds per hour.

Granular form ethylene copolymer was fed to the extrusion apparatus and plasticized under approximately 20,000 p.s.i. at from 475 to 500° F. Molten material was fed to the die under a pressure of about 1500 p.s.i. The die was a long tapered land die of rectangular cross section having a land length of 36 inches and about 2½ percent reduction in cross sectional area. The die was equipped with cooling plates on the top and bottom.

Run 1 was made extruding a 1×7 inch slab under the conditions stated above and uniformly cooling the entire length of the die on top and bottom.

Run 2 was made under the same conditions as run 1 and heat was added to a 12 inch length of each die side near the entrance portion of the die using the 10,500 watt strip heaters which were controlled to give a metal temperature of 150° F. in the side bushing portion of the die.

The samples were tested for internal stress by determining warpage. Samples from both runs were cut into four foot lengths, split down the center of the 7 inch width, fitted back together and the amount of warpage in the form of a center gap was observed. Run 1 resulted in a center gap of 1½ inches while run 2 resulted in a center gap of 1¼ inches, showing that moderate side heating reduces the amount of warpage.

EXAMPLE II

The same copolymer as used in Example I was extruded under the same conditions at the same rates from the same die as used in Example I.

Run 3 was made using a cooling system as illustrated in FIGURE 2, with cooling zone 22 having 3 inch wide cooling channels in the top and bottom plates, cooling zone 23 having 4 inch wide cooling channels and cooling zone 24 having 7 inch wide channels. Water was circulated in cooling zone 22 at 200° F., in cooling zone 23 at 100° F. and in cooling 24 at 80° F. Strip heaters as used in run 2 were adjusted to give a side bushing metal temperature of approximately 350° F.

It was felt that the center gap warpage as measured in Example I resulted from high internal stress in the outside edges of the 7 inch width and samples were tested by trimming the outside edges of a four foot long sample, splitting the trimmed sample down its width, fitting the bisected sample together and observing the center gap warpage. Samples from run 1 and run 3 were tested in this manner and the amount of trimming necessary to eliminate warpage was determined.

Samples from run 1 had to be trimmed back 1½ inches on both edges to eliminate warpage thus leaving a 4 inch wide, warp-free slab. Samples from run 3 were trimmed only ½ inch on both sides to eliminate warpage thus producing a 6 inch wide, warp-free slab.

These data show that controlling the amount of cooling in the die and heating the sides of the die results in an extrudate product having less warpage.

Further testing has shown that the good results of run 3 can be obtained by inserting a flow diversion device in the entrance portion of the die, using the cooling system described in Example II, and eliminating heat transfer to the sides of the die.

Reasonable variation and modification are within the scope of this invention which sets forth a novel method and apparatus for reducing internal stresses in an extrudate.

That which is claimed is:

1. An apparatus for producing an extrudate from a molten plastic material comprising:
   (a) a die; and
   (b) a plurality of separate heat transfer means in heat transfer relationship with different portions of said die, said separate heat transfer means being positioned and provided with separate means to regulate said heat transfer means whereby different controlled amounts of heat are removed from different circumferential portions of a given single cross section of said die so as to obtain an extrudate with reduced internal stresses.

2. The apparatus of claim 1 wherein said heat transfer means comprise a plurality of separate cooling zones and means associated therewith to cool said zones.

3. The apparatus of claim 1 wherein said heat transfer means includes both heating means and cooling means applied to said cross section.

4. The apparatus of claim 1 wherein said die is a long land die.

5. The apparatus of claim 1 wherein said die is tapered so that continuous contact is maintained between land surfaces of said die and the outer surfaces of said extrudate as said extrudate can travel through said die.

6. The apparatus of claim 3 wherein said die has a passageway of substantially rectangular cross section; wherein said cooling means are associated with the portions of said die which lie in planes parallel to the longer dimension of the passageway cross section; and wherein said heating means are associated with the portions of the die which lie in planes paralllel to the shorter dimension of the passageway cross section.

7. The apparatus of claim 6 wherein said cooling means comprise a plurality of cooling zones of varying size positioned longitudinally on the die, the cooling zone associated with a longitudinal portion of the die proximate to the die exit covering a longer transverse portion of said cross section and the cooling zone being associated with a longitudinal portion of the die proximate to the die entrance covering a shorter transverse portion of said cross section.

8. The apparatus of claim 1 wherein said die has a passageway of substantially rectangular cross section; wherein a flow diversion device is positioned in said passageway at the entrance portion of said die; and wherein said cooling means comprise a plurality of cooling zones of varying size positioned longitudinally on the die, the cooling zone associated with a longitudinal portion of the die proximate to the die exit covering a longer transverse portion of said cross section and the cooling zone being associated with a longitudinal portion of the die proximate to the die entrance covering a shorter transverse portion of said cross section.

9. In a method of producing an elongated article of predetermined cross sectional configuration from a plastic material including the steps of supplying said plastic material to a die having a passageway with a discharge end portion defining said cross sectional configuration and applying force to said plastic material in said die to effect movement of said plastic material through said discharge end to form said article; the improvement comprising separately controlling the amount of heat removed from different circumferential portions of a given single cross section of said die whereby heat is removed from said different circumferential portions at different controlled rates so as to reduce stresses in said article.

10. The method of claim 9 wherein the amount of heat removed from different circumferential portions of the die is controlled by cooling said portions at different rates.

11. The method of claim 9 wherein said heat transfer from the die is controlled by simultaneously heating and cooling different circumferential portions of the periphery of a cross section of the passageway bushing.

12. The method of claim 9 wherein said die passageway is rectangular in cross section and including the step of diverting said plastic material against the shorter land surfaces of the rectangular cross section.

13. The apparatus of claim 3 wherein said die has a passageway of substantially L-shaped cross section, said heating means are associated with the portions of the die which lie in planes parallel to the shorter dimensions of the passageway cross section and with the external vertex of the passageway cross section and said cooling means are associated with remaining portions of said passageway cross section.

References Cited

UNITED STATES PATENTS

| | | | |
|---|---|---|---|
| 2,375,827 | 5/1945 | Slaughter | 264—177 |
| 2,402,281 | 6/1946 | Green | 264—177 |
| 3,068,513 | 12/1962 | Chaffin | 264—176 |
| 3,119,148 | 1/1964 | Chambers et al. | 264—327 |
| 3,309,436 | 3/1967 | Larsen | 264—176 |

ROBERT F. WHITE, Primary Examiner

J. R. THURLOW, Assistant Examiner

U.S. Cl. X.R.

18—2, 12; 264—176, 177, 237, 327